United States Patent
Yung et al.

(10) Patent No.: US 6,920,309 B1
(45) Date of Patent: Jul. 19, 2005

(54) USER POSITIONING TECHNIQUE FOR MULTI-PLATFORM COMMUNICATION SYSTEM

(75) Inventors: Kar Yung, Torrance, CA (US); Frank A. Hagen, Palos Verdes Estates, CA (US); Donald C. D. Chang, Thousand Oaks, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 726 days.

(21) Appl. No.: 09/587,759

(22) Filed: Jun. 6, 2000

Related U.S. Application Data

(63) Continuation-in-part of application No. 09/271,997, filed on Mar. 18, 1999.

(51) Int. Cl.[7] ............................................. H04Q 7/22
(52) U.S. Cl. ...................... 455/13.1; 455/13.2; 455/430
(58) Field of Search .............................. 455/456, 13.1, 455/13.2, 12.1, 67.6, 502, 503, 430; 370/316, 326

(56) References Cited

U.S. PATENT DOCUMENTS

| | | | |
|---|---|---|---|
| 2,470,787 A | 5/1949 | Nosker | 342/12 |
| 3,384,891 A | 5/1968 | Anderson | 343/100 |
| 3,544,995 A | 12/1970 | Bottenburg et al. | 343/6 |
| 3,720,953 A | 3/1973 | Ajioka | 343/771 |
| 4,161,730 A | 7/1979 | Anderson | 342/352 |

(Continued)

FOREIGN PATENT DOCUMENTS

| | | |
|---|---|---|
| EP | 0 335 558 | 4/1989 |
| EP | 0 682 416 A | 11/1995 |
| EP | 0 749 252 A2 | 12/1996 |
| EP | 0 776 099 A2 | 5/1997 |
| EP | 0 837 568 A | 4/1998 |

(Continued)

OTHER PUBLICATIONS

U.S. Appl. No. 09/841,110, Chang et al., filed Apr. 24, 2001.

Chiba, Isamu et. al, "Digital Beam Forming (DBF) Antenna System for Mobile Communications", IEEE AES Systems Magazine, Sep. 1997, pp. 31–41.

Miura, Ryu et. al, "A DBF Self–Beam Steering Array Antenna for Mobile Satellite Applications Using Beam––Space Maximal–Ratio Combination", IEEE Trans. On Vehicular Technology, vol. 48, No. 3, May 1999, pp. 665–675.

Sato, Kazuo et al., "Development And Field Experiments of Phased Array Antenna For Land Vehicle Satellite Communications", IEEE Antennas and Propagation Society International Symposium, 1992, Jul. 1992, pp. 1073–1076.

(Continued)

*Primary Examiner*—William Trost
*Assistant Examiner*—Brandon J Miller
(74) *Attorney, Agent, or Firm*—Georgann S. Grunebach

(57) ABSTRACT

A mobile wireless communications system including a plurality of individual transponding nodes all in communication with a central processing hub. A local user signal is processed by the central processing hub and radiated through multiple paths to a plurality of the plurality of individual transponding platforms simultaneously. The signal is then re-radiated by each of the plurality of the plurality of individual transponding platforms to a mobile terminal associated with a remote user that receives the re-radiated signal from the plurality of the plurality of individual transponding platforms coherently and in phase. The number of transponders and codes used to transmit each user signal can be readily adapted to user requirements. The central hub can determine the position of each of the remote users based on stored information derived from the synchronization of the various signals, and specifically relating to the timing, phase or frequency of the signals in both the forward and return link.

36 Claims, 5 Drawing Sheets

U.S. PATENT DOCUMENTS

| | | | |
|---|---|---|---|
| 4,161,734 A | 7/1979 | Anderson | 342/352 |
| 4,359,733 A | 11/1982 | O'Neill | 343/6.5 |
| 4,613,864 A | 9/1986 | Hofgen | 343/357 |
| 4,635,063 A | 1/1987 | Chang et al. | 342/380 |
| 4,758,959 A | 7/1988 | Thoone et al. | 364/454 |
| 4,819,227 A | 4/1989 | Rosen | 370/75 |
| 4,897,661 A | 1/1990 | Hiraiwa | 342/457 |
| 4,979,170 A | 12/1990 | Gilhousen et al. | 370/104.1 |
| 4,994,809 A | 2/1991 | Yung et al. | 342/108 |
| 5,006,855 A | 4/1991 | Braff | 342/357 |
| 5,017,927 A | 5/1991 | Agrawal et al. | 342/371 |
| 5,077,562 A | 12/1991 | Chang et al. | 342/368 |
| 5,099,245 A | 3/1992 | Sagey | 345/357 |
| 5,111,209 A | 5/1992 | Toriyama | 342/357 |
| 5,126,748 A | 6/1992 | Ames et al. | 342/353 |
| 5,218,619 A | 6/1993 | Dent | 375/1 |
| 5,233,626 A | 8/1993 | Ames | 375/1 |
| 5,278,863 A | 1/1994 | Briskman | 375/1 |
| 5,319,673 A | 6/1994 | Briskman | 375/1 |
| 5,327,455 A | 7/1994 | De Gaudenzi et al. | 375/1 |
| 5,365,447 A | 11/1994 | Dennis | 364/449 |
| 5,379,320 A | 1/1995 | Fernandes et al. | 375/1 |
| 5,387,916 A | 2/1995 | Cohn | 342/44 |
| 5,410,314 A | 4/1995 | Frush et al. | 342/26 |
| 5,423,059 A | 6/1995 | LoGalbo et al. | 455/51.2 |
| 5,444,450 A | 8/1995 | Olds et al. | 342/357 |
| 5,485,485 A | 1/1996 | Briskman et al. | 375/200 |
| 5,525,995 A | 6/1996 | Benner | 342/90 |
| 5,550,809 A | 8/1996 | Bottomley et al. | 370/18 |
| 5,555,257 A | 9/1996 | Dent | 370/95.1 |
| 5,572,216 A | 11/1996 | Weinberg et al. | 342/357 |
| 5,589,834 A | 12/1996 | Weinberg | 342/354 |
| 5,592,471 A | 1/1997 | Briskman | 455/52.3 |
| 5,594,941 A * | 1/1997 | Dent | 455/13.4 |
| 5,612,701 A | 3/1997 | Diekelman | 342/354 |
| 5,644,572 A | 7/1997 | Olds et al. | 370/324 |
| 5,739,785 A | 4/1998 | Allison et al. | 342/357 |
| 5,764,188 A | 6/1998 | Ghosh et al. | 342/457 |
| 5,790,070 A | 8/1998 | Natarajan et al. | 342/354 |
| 5,839,053 A | 11/1998 | Bosch et al. | 455/13.1 |
| 5,856,804 A | 1/1999 | Turcotte et al. | 342/371 |
| 5,864,579 A | 1/1999 | Briskman | 375/200 |
| 5,867,109 A | 2/1999 | Wiedeman | 340/827 |
| 5,878,034 A | 3/1999 | Hershey et al. | 370/321 |
| 5,903,549 A | 5/1999 | Von der Embse et al. | 370/310 |
| 5,907,813 A * | 5/1999 | Johnson | 455/502 |
| 5,909,460 A | 6/1999 | Dent | 375/200 |
| 5,917,447 A | 6/1999 | Wang et al. | 342/383 |
| 5,918,157 A | 6/1999 | Wiedeman et al. | |
| 5,920,284 A | 7/1999 | Victor | 342/357.01 |
| 5,944,770 A | 8/1999 | Enge et al. | 701/707 |
| 5,945,948 A | 8/1999 | Buford et al. | 342/457 |
| 5,949,766 A | 9/1999 | Ibanez-Meier et al. | |
| 5,956,619 A | 9/1999 | Gallagher et al. | |
| 5,969,674 A * | 10/1999 | von der Embse | 342/357 |
| 5,973,647 A | 10/1999 | Barrett et al. | 343/713 |
| 5,974,039 A | 10/1999 | Schilling | 370/335 |
| 6,020,845 A | 2/2000 | Weinberg | 342/354 |
| 6,028,884 A | 2/2000 | Silberger et al. | 375/200 |
| 6,111,542 A | 8/2000 | Day et al. | 342/359 |
| 6,118,824 A | 9/2000 | Smith et al. | 375/259 |
| 6,119,016 A * | 9/2000 | Matusevich | 455/502 |
| 6,138,012 A | 10/2000 | Krutz et al. | 455/427 |
| 6,147,658 A | 11/2000 | Higashi et al. | 343/853 |
| 6,151,308 A | 11/2000 | Ibanez-Meier et al. | |
| 6,195,555 B1 * | 2/2001 | Dent | 455/456 |
| 6,208,626 B1 | 3/2001 | Brewer | 370/324 |
| 6,229,477 B1 | 5/2001 | Chang et al. | 342/357 |
| 6,243,587 B1 * | 6/2001 | Dent et al. | 455/456 |
| 6,246,363 B1 | 6/2001 | Yung et al. | 342/357 |
| 6,266,533 B1 * | 7/2001 | Zadeh | 455/456 |
| 6,289,211 B1 * | 9/2001 | Koorapaty | 455/404 |
| 6,295,440 B2 | 9/2001 | Chang et al. | 455/13.1 |
| 6,298,238 B1 | 10/2001 | Dai | 455/456 |
| 6,313,790 B2 | 11/2001 | Chang et al. | |
| 6,314,269 B1 | 11/2001 | Hart et al. | |
| 6,337,980 B1 | 1/2002 | Chang et al. | 455/430 |
| 6,340,947 B1 | 1/2002 | Chang et al. | 342/357.01 |
| 6,377,208 B2 | 4/2002 | Chang et al. | 342/357.01 |
| 6,388,615 B1 | 5/2002 | Chang et al. | 342/368 |
| 6,480,788 B2 | 11/2002 | Kilfeather et al. | |
| 6,563,457 B2 | 5/2003 | Chang et al. | |
| 2002/0053987 A | 5/1992 | Chang et al. | |
| 2001/0000167 A1 | 4/2001 | Chang et al. | 455/13.1 |
| 2001/0045903 A1 | 11/2001 | Chang et al. | 342/357.01 |

FOREIGN PATENT DOCUMENTS

| | | |
|---|---|---|
| EP | 0 845 874 A | 6/1998 |
| EP | 0 860 708 A2 | 8/1998 |
| EP | 0 860 709 A2 | 8/1998 |
| EP | 0 860 710 A | 8/1998 |
| EP | 0 860 952 A2 | 8/1998 |
| EP | 1 010 988 A | 6/2000 |
| EP | 1 037 403 A2 | 9/2000 |
| EP | 1 037 403 A | 9/2000 |
| EP | 1 148 662 A2 | 10/2001 |
| EP | 1 158 698 A2 | 11/2001 |
| GB | 2 271 902 A | 10/1993 |
| GB | 2 306 827 A | 5/1997 |
| GB | 2 349 045 A | 10/2000 |
| JP | 2-28580 | 1/1990 |
| JP | 3-291584 | 12/1991 |
| JP | 4-27887 | 1/1992 |
| JP | 07146995 A | 6/1995 |
| JP | 08015405 A | 1/1996 |
| JP | 09026328 | 1/1997 |
| JP | 09113600 A | 5/1997 |
| JP | 10090391 A | 4/1998 |
| JP | 10-209939 | 8/1998 |
| JP | 11-8579 | 1/1999 |
| WO | WO 90/13186 | 11/1990 |
| WO | WO 96/22661 | 7/1996 |
| WO | WO 98//02762 A | 1/1998 |
| WO | WO 01/91310 A3 | 11/2001 |
| WO | WO 01/93458 A | 12/2001 |
| WO | WO 01/95522 A1 | 12/2001 |

OTHER PUBLICATIONS

Sakakibara, Kunio et. al, "A Two–Beam Slotted Leaky Waveguide Array for Mobile Reception of Dual–Polarization DBS", IEEE Transactions on Vehicular Technology, vol. 48, No. 1, Jan. 1999, pp. 1–7.

Teles J et al.: "Overview of TDRSS" Orbit Determination and Analysis. PSD Meeting, Cospar Technical Panel on Satellite Dynamics, $13^{th}$ Cospar Scientific Assembly, Hamburg, Germany, Jul. 11–21, 1994, Advances in Space Research, pp. 67–76.

Bricker, P et al.: "Integrated Receiver for NASA Tracking and Data Relay Satellite System", MILCOM 90. A new Era, 1990 IEEE Military Communications Conference, Monterey, CA, USA, Sep. 30–Oct. 3, 1990, p. 1–5.

Dunham, J B, et al.: "Onboard Orbit Estimation with Tracking and Data Relay Satellite System Data", Journal of Guidance, Control, and Dynamics, Jul.–Aug. 1983, USA, vol. 6 NR.4, pp. 292–301.

K. H. Bethke, "A Novel Noncooperative Near–Range Radar Network or Traffic Guidance and Control on Airport Surfaces", IEEE Transactions on Control Systems Technology, vol. 1, No. 3, Sep. 1993.

Doc 9524 FANS/4–WP/76, International Civil Aviation Organization, Special Committee on Future Air Navigation Systems, Fourth Meeting, Montreal, May 2–20, 1988, Report, pp. 3.2B–2 & 3.2B–3.

U.S. Appl. No. 09/576,652, Hagen et al., filed May 22, 2000.
U.S. Appl. No. 09/584,012, Chang et al. filed May 30, 2000.
U.S. Appl. No. 09/576,648, Yung et al., filed May 22, 2000.
U.S. Appl. No. 09/644,225, Hagen et al., filed Aug. 21, 2000.
U.S. Appl. No. 09/587,960, Yung et al., filed Jun. 6, 2000.
U.S. Appl. No. 09/271,997, Chang et al., filed Mar. 18, 1999.
U.S. Appl. No. 09/209,062, Yung et al., filed Dec. 10, 1998.
U.S. Appl. No. 09/550,505, Chang et al., filed Apr. 17, 2000.
U.S. Appl. No. 08/803,937, Chang et al., filed Feb. 21, 1997.
U.S. Appl. No. 09/669,095, Yung et al., filed Sep. 25, 2000.

U.S. Appl. No. 09/655,498, Chang et al., filed Sep. 5, 2000.

K. K. Chan, F. Marcoux, M. Forest, L. Martins–Camelo, "A Circularly Polarized Waveguide Array for Leo Satellite Communications", pp. 154–157, IEEE1999 AP–S International Symposium, Jun. 1999.

M. Oodo, R. Miura, Y. Hase, "Onboard DBF Antenna for Stratospheric Platform", pp. 125–128, IEEE Conference on Phased Array Systems and Technology, California, May 21–25, 2000.

Yokosuka Research Park, "The First Stratospheric Platform Systems Workshop", pp 1–216, May 12–13, 1999.

Colella, Nicholas J. et al., "The HALO Network ™", IEEE Communications Magazine, Jun. 2000, pp. 142–148.

Colella, Nicholas J. et al., "High–Speed Internet Access via Stratospheric HALO Aircraft", INET 99 Proceedings, Internet Society, Technology, Wireless, 13 pages, Jun. 8, 1999.

* cited by examiner

USER POSITIONING TECHNIQUE FOR MULTI-PLATFORM COMMUNICATION SYSTEM

CROSS-REFERENCE TO RELATED APPLICATIONS

The present application is a continuation-in-part of assignee's co-pending U.S. Ser. No. 09/271,997, entitled "Multiple Satellite Mobile Communications Method and Apparatus for Hand-Held Terminals," filed on Mar. 18, 1999.

TECHNICAL FIELD

The present invention relates generally to a wireless communication system. More specifically, the present invention relates to a user positioning technique for a multi-platform wireless communication system.

BACKGROUND ART

Current mobile satellite communication systems, such as Iridium, Globalstar, and ICO, utilize low-cost user terminals as one of their key system features. To maintain communications linkage with these current mobile systems, the system satellites provide multiple beam and high-gain services to the subscribers. The low-cost and low-gain handheld terminals utilized by the users of these systems, transmit and receive signals to and from high performance satellites which populate almost the entire hemisphere. Some of these current systems require access to at least two satellites to assure a soft hand-over process as the satellites progress from horizon to horizon. As a result, the satellite system becomes more reliable and available as more satellites come into a user's field of view (FOV). The satellite constellations provided by these current systems are thus sized to guarantee a minimum number of satellites within a user's FOV over large coverage areas at all times.

All of these current mobile satellite communication systems, however, suffer from certain disadvantages. First, they all have limited frequency (the term "frequency" is generalized herein to refer to frequency, time slot or CDMA code) resources. Any given frequency over a given ground position can only be utilized by one user at a time. Thus, if one user accesses a satellite using a particular frequency slot to communicate to his counterpart on network, other satellites and/or users in the same region cannot reuse the same frequency resource in the same local area. In particular, if a nearby secondary user has a handset that requires the same frequency resources as is being utilized by the first user, the second user is unable to access the system, even via different satellites. This is true regardless of the sophistication of the system, including systems that utilize multiple beam satellite designs. Even when multiple satellites are available at a given geographic location, the same frequency spectrum cannot be used by more than one user in a local area. The availability of multiple satellites merely serves to increase the availability of the system to the user. However, the total capacity of these mobile communication satellite systems is still limited by their inefficient usage of the available frequency resources. Thus, the potential growth of these current satellite communication systems is inherently limited.

Additionally, current telecommunications systems generally allow only mobile-to-hub and hub-to-mobile communications in most low earth orbit and medium earth orbit mobile satellite constellations. Mobile-to-mobile linkages require multiple hops between hubs. This means that two or more frequency resources must be committed by the system to close the links.

It is clearly desirable to provide a mobile communication satellite system that relaxes the above constraints, and more efficiently utilizes current mobile satellite communication system resources, while also providing much greater opportunity for system growth.

SUMMARY OF THE INVENTION

It is an object of the present invention to provide a wireless communication system with reduced limitations on frequency re-use for point-to-point communications.

It is another object of the present invention to provide a wireless communication system that utilizes individual transponders and mobile terminals that are relatively simple and of low complexity.

It is a further object of the present invention to provide a wireless communication system with high system reliability through graceful degradation.

It is still another object of the present invention to provide a multi-transponder wireless communication system that allows flexible combination of user types.

It is a related object of the present invention to provide a multi-transponder wireless communication system with better utilization of total system resources.

It is yet a further object of the present invention to provide a user positioning technique for a multi-platform system that increases the total monetary return.

In accordance with the above and other objects of the present invention, a multi-platform wireless communication system is provided. The wireless communication system includes a plurality of individual communication transponding nodes. The plurality of individual transponding nodes are each in communication with a ground hub such that a signal processed by the ground hub in the forward link is radiated with compensating time delays to one or more of the plurality of individual transponders. The radiated signals are then re-radiated by the plurality of individual transponders and coherently received and processed by a mobile user terminal. The return link signal path is the reverse of the forward link.

In accordance with another object of the present invention, the system includes a plurality of individual transponding nodes. The system also includes a plurality of mobile terminals each associated with a respective remote user. A central hub establishes a link with one or more of the plurality of mobile terminals through one or more of the plurality of transponding nodes. The central hub processes one or more local user signals from one or more of the remote users and synchronizes the one or more local user signals such that an intended user receives all signals synchronously and in phase. The central hub can then determine the position of each of the remote users based on the information stored on the central hub regarding the timing, phase, or frequency of signals in both the forward and return links.

The system further includes a plurality of individual resource cells, each associated with a particular one of the plurality of individual transponding nodes and a particular on e of the plurality of available codes. The system further includes a plurality of mobile terminals of different types, each of which is assigned to operate in one or more of the plurality of individual resource cells.

These and other features of the present invention will become apparent from the following description of the invention, when viewed in accordance with the accompanying drawings and appended claims.

BEST MODE(S) FOR CARRYING OUT THE INVENTION

Referring now to the figures, the disclosed mobile communication system can be utilized to break away from the frequency spectrum limitation discussed above and provide much more efficient means to re-use the allocated mobile satellite and wireless spectrum multiple times. By eliminating this frequency spectrum limitation on the operation of multiple satellites, the overall capacity of existing mobile satellite and wireless communication systems can more readily expand.

Figure 1:
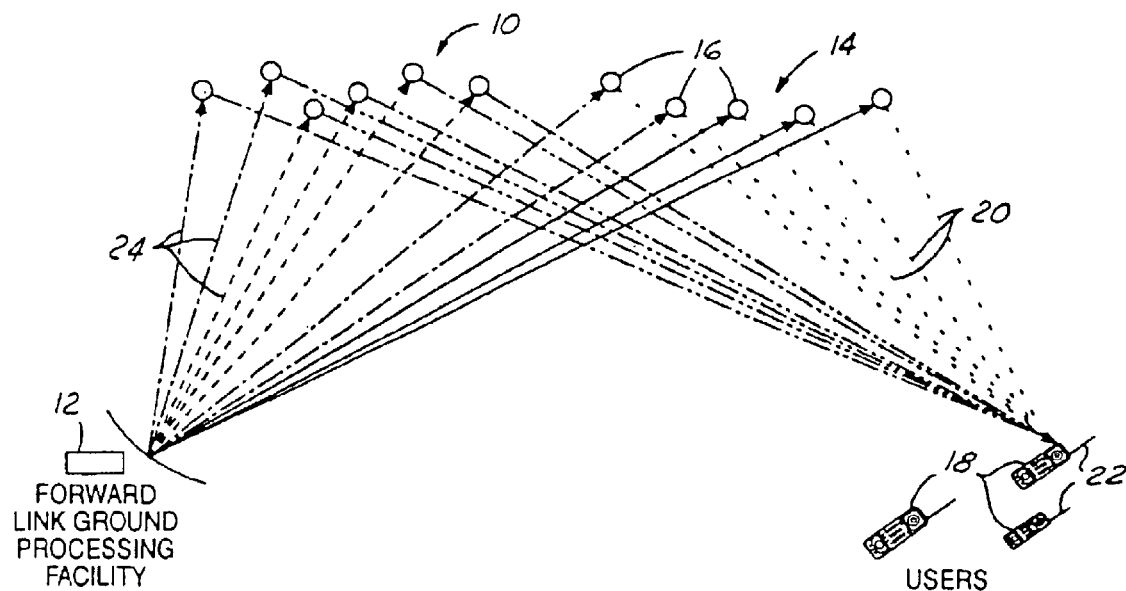
FIG. 1 is a schematic illustration of the forward link geometry of a mobile satellite communications system in accordance with the present invention.

Referring now to FIG. 1, a mobile satellite communication system 10 in accordance with a preferred embodiment of the present invention is illustrated. In FIG. 1, the mobile satellite communications system 10 is illustrated in a forward link mode. The mobile satellite communications system 10 includes a ground telecommunications hub 12, a satellite constellation 14 including a plurality of individual satellites 16, and a plurality of hand-held user terminals 18 such as mobile phones. As discussed in more detail below, the user terminals 18 can receive signals 20 simultaneously from multiple satellites 16 via their broad beam antennas 22. The ground telecommunications hub 12 is in communication with all of the satellites 16 in the satellite constellation 14 individually and simultaneously. The hub 12 also preprocesses user signals to compensate for path differentials before sending radiated signals 24 to the satellites 16, as discussed in more detail below.

In accordance with the preferred embodiment, the design of the individual satellites 14 can be significantly simplified over those utilized in prior mobile systems because the satellite constellation 14 functions as a sparse radiating array. It is known that the more satellites 16 that are included in a satellite constellation 14, the better the performance the mobile satellite communications system 10 will achieve. Satellites that are simple, small, and provide high performance are preferable. This is because the performance of the system 10 depends more heavily on the satellite constellation 14 than on the individual satellites 16.

In a transmit mode, shown in FIG. 1, the individual satellites 16 radiate modulated RF power to a chosen field of view ("FOV"). The system 10 is still operable with reduced capacity and no reconfiguration even if one individual satellite 16 is lost for any reason. As a result, the system 10 features graceful degradation characteristics and provides very high reliability and availability. Most of the complexity of the system 10 is located in the ground hubs 12, which locate and track the potential users and perform the major functions of beamforming and filtering, as discussed below.

Figure 2:
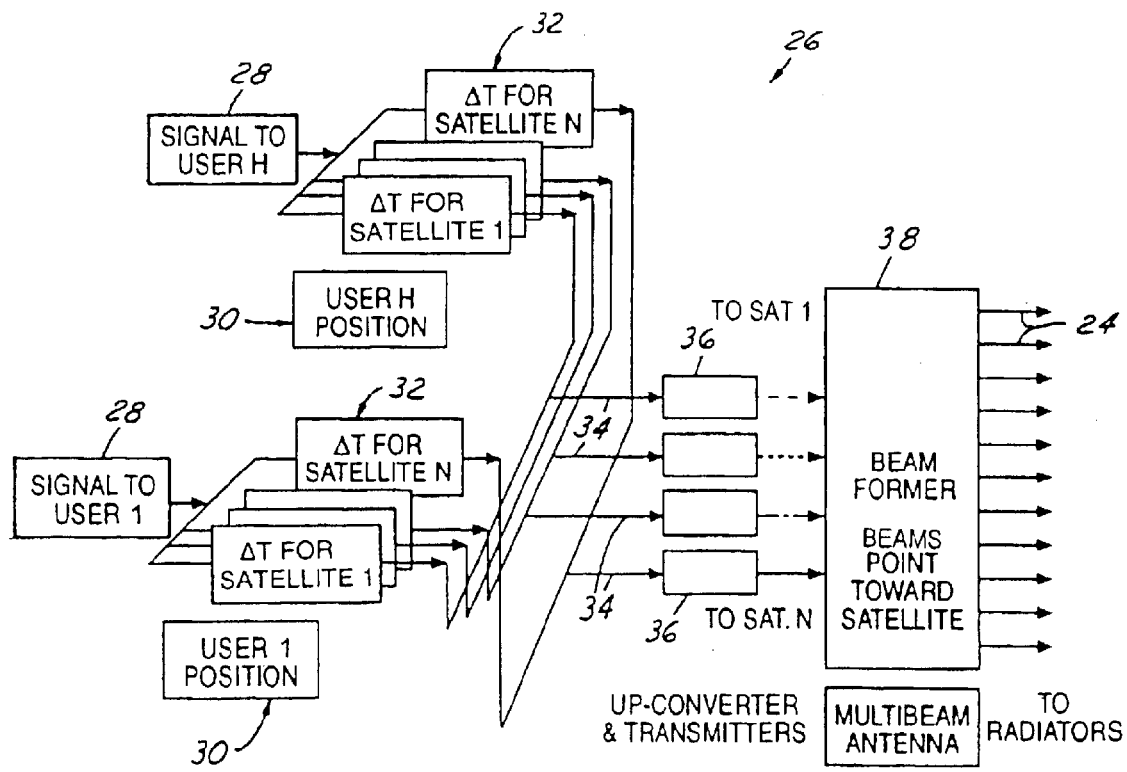
FIG. 2 is a schematic block diagram illustrating the signal transmission function of a ground telecommunications hub for a wireless communications system in accordance with a preferred embodiment of the present invention.

As shown in FIG. 2, the processing performed at the ground telecommunications hub 12 is diagrammatically illustrated. The hub 12 tracks, updates, and forward predicts the time variant differential information among various paths between the hub 12 and the intended user terminals 18. The accuracy of this information must be within a tenth of an RF wavelength. For UHF satellite systems, the required path differential accuracy is preferably about ten (10) centimeters. For L and S band mobile satellite constellations, the accuracy must be on the order of one (1) centimeter. Unfortunately, the conventional or GPS techniques are not able to provide the required accuracy.

In accordance with the present invention, the required accuracy of the equivalent path differentials, including all propagation distortion, can be provided using two-way active calibration and R2N (two-way ranging navigation) techniques. An R2N technique is just one technique for obtaining positioning information by which to locate the positioning of the satellites and users precisely using multiple calibration sites and is described in co-pending U.S. patent application Ser. No. 09/209,062, entitled "Method and System for Determining a Position of a Transceiver Unit Incorporating Two-Way Ranging Navigation as a Calibration Reference for GPS," and filed on Dec. 10, 1998. Other known techniques may also be utilized.

The ground telecommunications hub 12 has a processing center 26 that processes each signal and is shown in a transmit mode in FIG. 2. The hub 12 has the capability to address the plurality of satellites 16 individually through the use of antenna spatial discrimination to provide separate signals to different satellites. Alternatively, code identification can also be used to address different satellites independently.

As shown in FIG. 2, assuming that there are "H" users, the signals from user 1 to user H, identified generally by reference number 28, are input into the processing center 26. The position of the various users (1 to H), are determined generally by the circuitry from the various user signals 28, designated by reference number 30. The various user signals 28 for user 1 to user H are then combined for transmission to the different satellites 16, as generally indicated by reference number 32. In this case, the signal is sent to N satellites. The combined signals are then amplified, filtered, up converted, and then further amplified, as generally indicated by reference number 36. These signals are then delivered to a multiple beam antenna 38 where beamforming processing is done so that the signals can be transmitted to the N satellites via radiating signals 24. The beam-forming process can be done in baseband or a low IF frequency band by either digital or analog means. For a low bandwidth (less than a few MHz signals), digital implementation can provide cost advantages. The processed signal 24, radiated from the ground hub 12 to each satellite, is amplified, filtered, and then re-radiated by each of the multiple satellites 16 to arrive at a designated user location simultaneously. Consequently, the radiated signals from the multiple satellites will be received coherently by a simple hand held terminal 22.

Equivalently, the effect of the spatial processing performed by the processing center 26 is to focus signal strength on the user from multiple satellites 16, which act like sparsely separated portions of a large active reflector. Therefore, the processing on the ground will insert different time delays into the signals 24 which are radiated via various paths. The time delays will be inserted into the signals 24 as if the satellites were located on an ellipsoidal surface, of which the two foci are located exactly at the hub 12 and the designated user 18 positions respectively. In low and middle earth orbit constellations, the users 18 and the hub 12 will always be in the near field of the sparse array.

Figure 3:
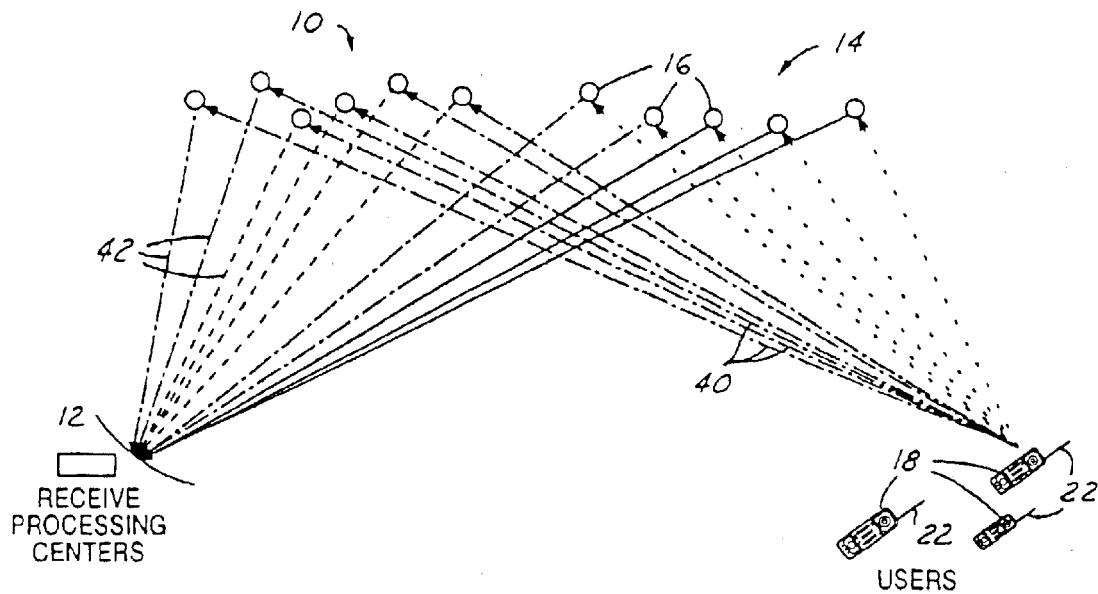
FIG. 3 is a schematic illustration of the return link geometry of a wireless communications system in accordance with a preferred embodiment of the present invention.

In a receive mode, shown in FIG. 3, the individual satellites 16 collect RF signals from the same FOV. FIG. 3 illustrates the return link geometry for receiving signals sent from the user terminals 18 to the ground telecommunications hub 12. As shown in FIG. 3, there are two groups of links involved: the links between users 18 and the satellites 16, generally indicated by reference number 40, and those between the satellites 16 and the hub 12, as generally indicated by reference number 42. For best performance, the user antennas 22 preferably are able to illuminate all the satellites 16 involved. This will lead to a constraint on the variation of the gain of the user antenna 22 over the cluster.

As with the forward link geometry, the satellites 16 will amplify the signals 40 received from the users 18 and re-radiate the signals 42 toward the hub 12. The hub 12 can receive signals 42 independently, but simultaneously from the satellites 16, and will add the signals 42 from different satellites coherently in the post-processor 44 as illustrated in FIG. 4.

Figure 4:
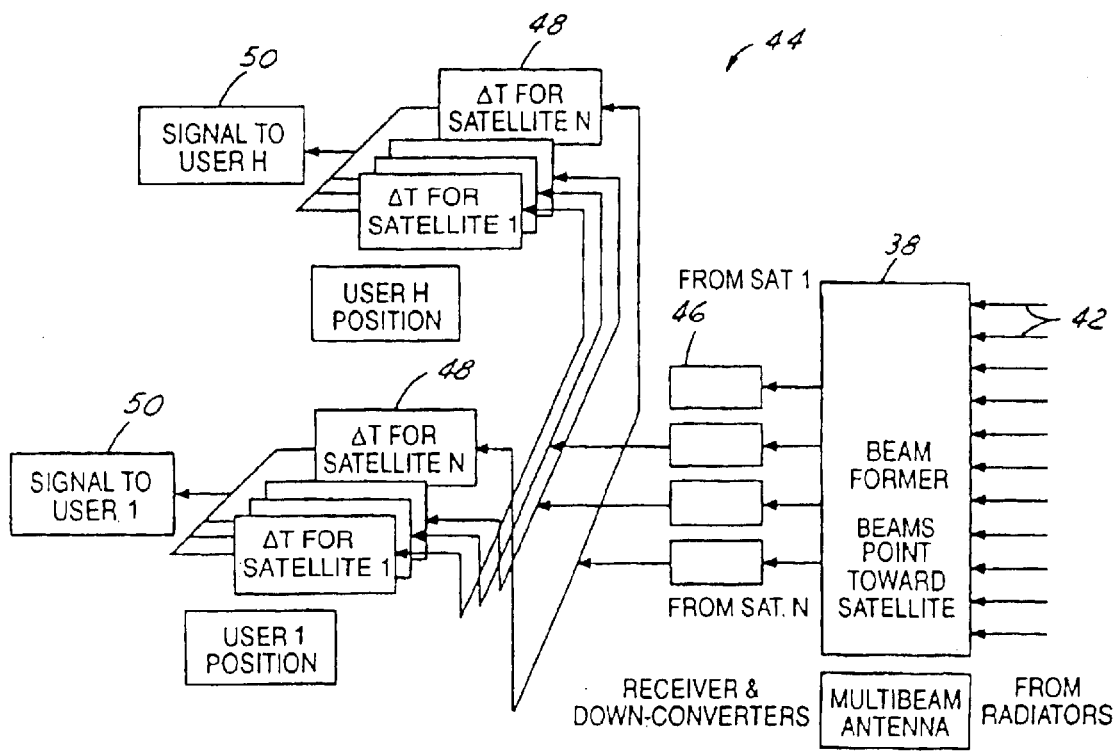
FIG. 4 is a schematic block diagram illustrating the signal receive function of a ground telecommunications hub or a wireless communications system in accordance with a preferred embodiment of the present invention.

The signal flows on the block diagram shown in FIG. 4 illustrate the receive function of the post-processor 40 and the hub 12. The signal flows are reversed from the corresponding ones in FIG. 2. Therefore the receive process will not be reiterated in detail. However, the links 42 from the satellites 16 to the hub 12 are received at the beamformer 38 and then transferred to the receiver and down converters 46 before the signals are separated. The signals are separated depending upon the user from which they are received, as generally indicated by reference number 48, and then sent to the specific user 1 through H, as generally indicated by reference number 50. It should be understood that both the receive and transmit function are a necessary part of the pathlink calibration and user positioning.

The technique of the present invention has been demonstrated to significantly reduce the average side lobe levels. It has been determined that this is due to three factors. First, the proposed architecture is not a periodic array, but rather a randomly spaced sparse array, which has no grating lobes. Although the average side lobe level at a single frequency is relatively high, the level decreases with increasing bandwidth. Second, the large sparsely filled array formed by moving satellites is a large extended aperture size. Thus, all of the users on the ground are in the near field of the extended aperture and the wave fronts received by all users are spherical instead of planar. Consequently, dispersion effects become much more pronounced than would be the case in the far field. The dispersion grows very fast as a probe is scanned away from the main beam and the dispersion smears the power distribution very effectively over a finite signal bandwidth. Third, the communication system is preferably designed with a large frequency bandwidth spectrum. The information signal will therefore be spread over this bandwidth via CDMA or through short duration waveforms for TDMA schemes.

Figure 5:
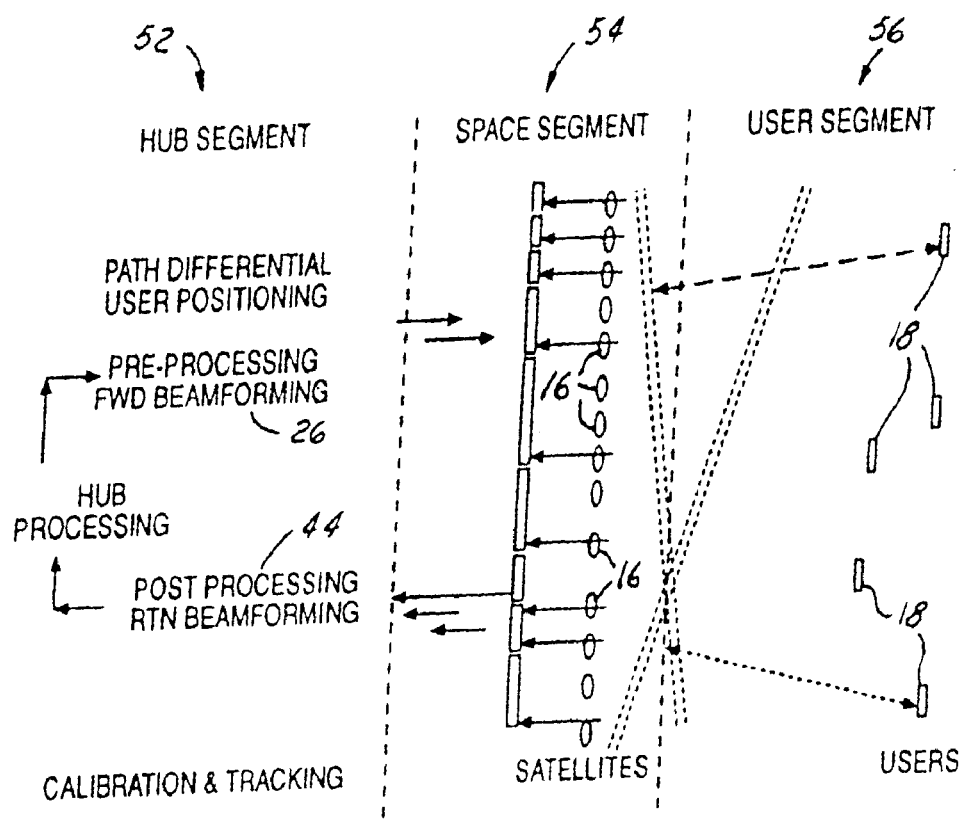
FIG. 5 is a schematic flow diagram illustrating the overall architecture for a wireless communications system in accordance with a preferred embodiment of the present invention.

FIG. 5 illustrates diagrammatically the operation of the invention, which allows for the increased re-use of precious frequency spectrum by multiple satellites. The advantages provided by this system include no limitation on frequency re-use by additional satellites for point-to-point communications. Rather, the capacity of this system is only limited by total satellite RF power. Further, the preferred embodiment allows for the use of simple and low cost satellite designs, because the more satellites included in the constellation, the better the performance of the overall system. The system also provides high system reliability through graceful degradation, as well as concentrating complex processing at the hubs.

The preferred embodiment creates demand for a large number of low cost satellites and also uses R2N techniques to perform satellite and user positioning. The more users using this system, the more accurately the satellite and user positions can be determined. However, even more important than the actual positions of the users and satellites are the path lengths traversed by the signals. Therefore, periodic calibration techniques applied directly to those path lengths may be much simpler and more cost effective. Further, the system also benefits from large percentage bandwidths available with CDMA and TDMA systems.

As shown in FIG. 5, the present invention is divided up into three segments: a hub segment 52 containing the ground telecommunications hub 12, a space segment 54 containing a plurality of individual satellites 16, and a user segment 56, having a plurality of user terminals 18. The hub segment also has a processing center 26 and a post-processor 44 for processing the received and transmitted signals.

The user terminals 18 receive and transmit signals simultaneously from/to multiple satellites 16 via their broad beam antennas. The user terminals 18 do not require any capability to separately address the individual satellites 16 of the space segment 54. The hub 12 maintains links with each of the satellites 16 in the space segment 54 individually and simultaneously. The hub 12 pre-processes the signals intended for each remote user on transmission and post-processes the signals supplied to each local user on reception to compensate for path differentials. These corrections are separately computed and applied to the signals transmitted to or received from each satellite 16 of the space segment 54 for each user.

Figure 6:
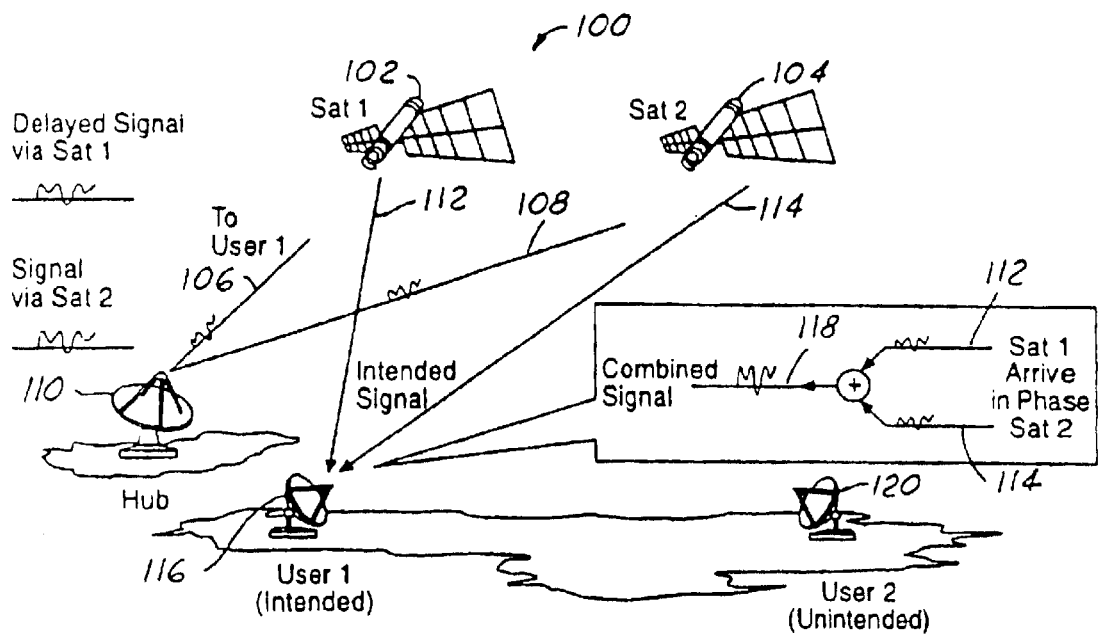
FIG. 6 is a schematic illustration of a multi-transponder wireless communication system illustrating signals being received coherently by their intended remote user.

FIG. 6 illustrates a multi-platform communication system 100 with improved frequency reuse efficiency in accordance with a preferred embodiment of the present invention. In particular, the system illustrated in FIG. 6 uses CDMA coding to subdivide the frequency resource among the various users. The system 100 enables a plurality of transponders 102, 104 to receive signals 106, 108 from the ground hub 110 and to transmit the signals 112, 114 at the same frequency with reduced interference to the intended user 116 from signals intended for other users. This is achieved by synchronizing the transmitted signals at the hub in such a way that the intended user 116 will receive all of the signals 112, 114 synchronously and completely in phase.

Based on the distances from the hub 110, to the various transponders 102, 104 and the distances between the transponders 102, 104 and the intended user 116, the appropriate compensating time delays are calculated and injected into each forward link message at the hub such that the intended user will coherently receive a combined signal from all the transponders as generally indicated at 118. The forward link to the intended user 116 follows the sequence of the hub 110 to the first transponder 102 to the user 116 (hub→trans 1→user 1) and also from the hub 110 to the second transponder 104 to the user 116 (hub→trans 2→user 1). Using the correct time delay on each forward link, all intended signals 112, 114 will arrive at the intended user 116 in phase. Conversely, the same signals intended for the intended user 116 will arrive out of phase at a non-intended user 120 and all other non-intended users in the area. This is shown in FIG. 7, which is described below.

Figure 7:
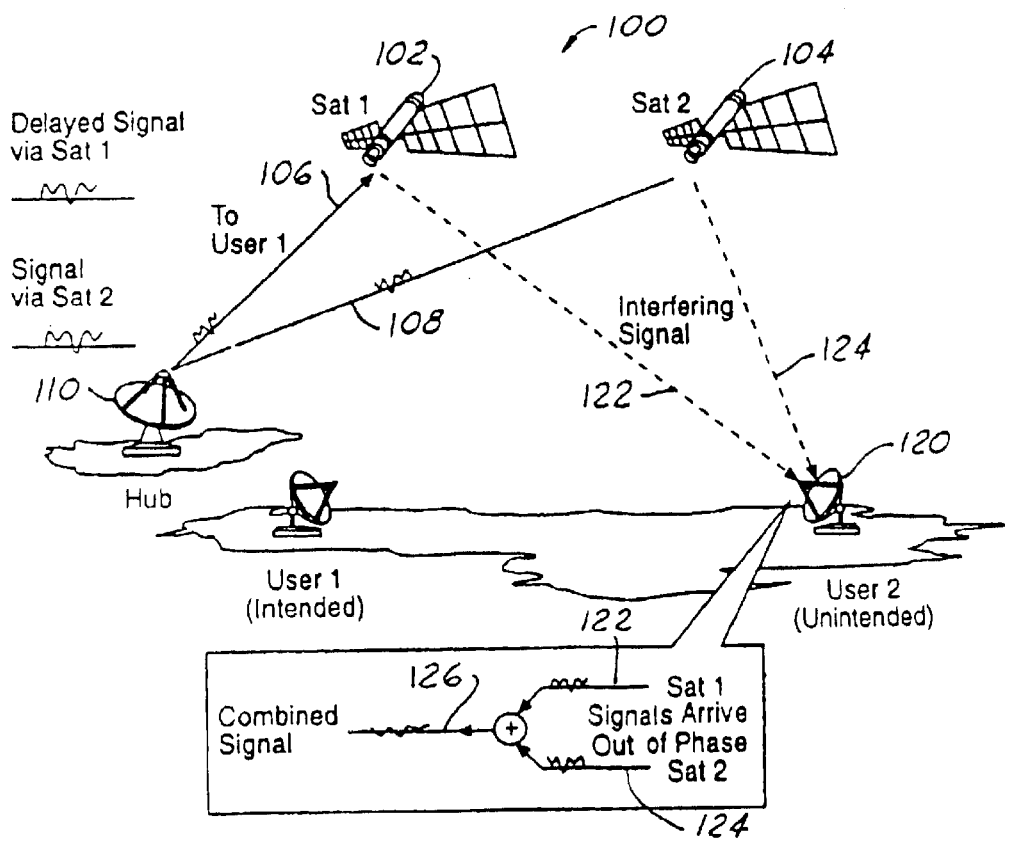
FIG. 7 is a schematic illustration of the multi-transponder wireless communication system of FIG. 6 illustrating the same signals being received incoherently by a remote non-intended user.

FIG. 7, illustrates the operation of the system of FIG. 6 with respect to the non-intended user 120. The distance between the hub 116 and the first transponder 102 and the distance between the first transponder 102 and the non-intended user 120 (hub→trans 1→user 2) and the distance between the hub 116 and the second transponder 104 and the distance between the second transponder 104 and the non-intended user 120 (hub→trans 2→user 2) are different in this case, even after compensation by the hub. Because of the distance differences, the signals 122, 124 will arrive at the non-intended user 120 at a different times and out-of-phase. The combined signal 126 will thus appear as noise and can be rejected as such by the terminal of the non-intended user 120.

It should be understood that the transponders 102, 104 can be part of any type of wireless communication system or can even be selected from several such systems. For example, while a space based system using satellites is illustrated, regional and national tower-based cellular networks for fixed and mobile communications may also be utilized. Additionally, any high altitude platform system, such as manned/unmanned airships, balloons, or airplanes may also be utilized. Further, while only two transponders are illustrated: an unlimited number of transponders may be utilized. Moreover, while the multiple transponders are shown as being part of a unitary system, any combination of transponders can be used to transmit signals in accordance with the present invention. For example, a signal may be transmitted to a user through both a space-based system and a high altitude platform system. Finally, different sets of transponders may be used to communicate with different users. These various sets may overlap in whole, in part or not at all.

Figure 8:
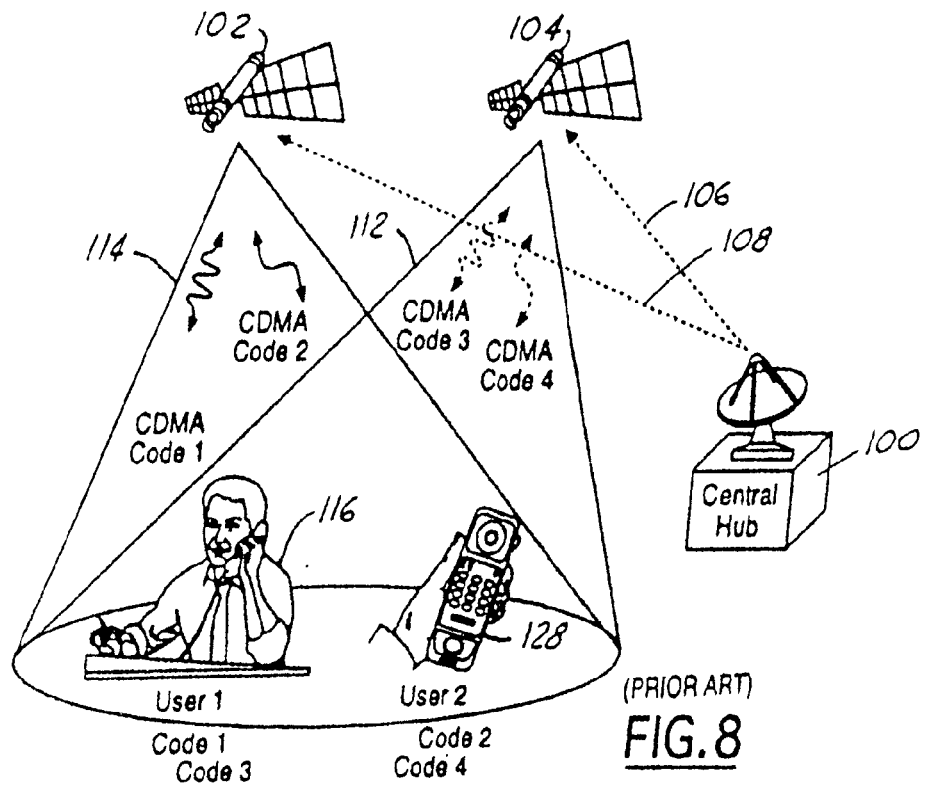
FIG. 8 is a schematic illustration of a conventional approach to an asynchronous CDMA system that may be utilized in accordance with the present invention.

As is known, in conventional CDMA single transponder systems, unique CDMA codes are assigned to each user to avoid interference. Similarly, in multi-transponder systems, when two or more transponders are serving the same geographical location, unique CDMA codes must be used to distinguish the various signals and to avoid interference. For example, as shown in FIG. 8, which illustrates a conventional CDMA multi-transponder system, user 116 must use different codes for signals 112, 114 received from the two different transponders 102, 104. Thus, two distinct codes, "code 1" and "code 3" are assigned to the same user 116 in this example, with "code 1" being assigned to signal 112 and "code 3" being assigned to signal 114. If both transponders 102, 104 were to transmit at "code 1", the two received signals 112, 114 would interfere with each other and the terminal of the user 116 would not be able to decode the signals correctly. Two additional codes must be assigned to each additional user, such as user 128 who is assigned codes 2 and 4.

The various CDMA codes for co-located users can be synchronous or asynchronous. A synchronous orthogonal code gives an advantage of about 15 dB or better over asynchronous CDMA codes. For multiple platforms, it is hard to synchronize CDMA codes among users. Thus, for the disclosed multi-platform system, asynchronous CDMA communication is assumed. Although multiple transponder nodes increase the system availability and total power resource, it under-utilizes the system's full potential, because there are only a finite number of codes available due to the finite bandwidth available to a system. Thus, the total bandwidth limits the number of users the system can serve and the system is unable to fully utilize the power and capacity it was designed to handle.

Figure 9:
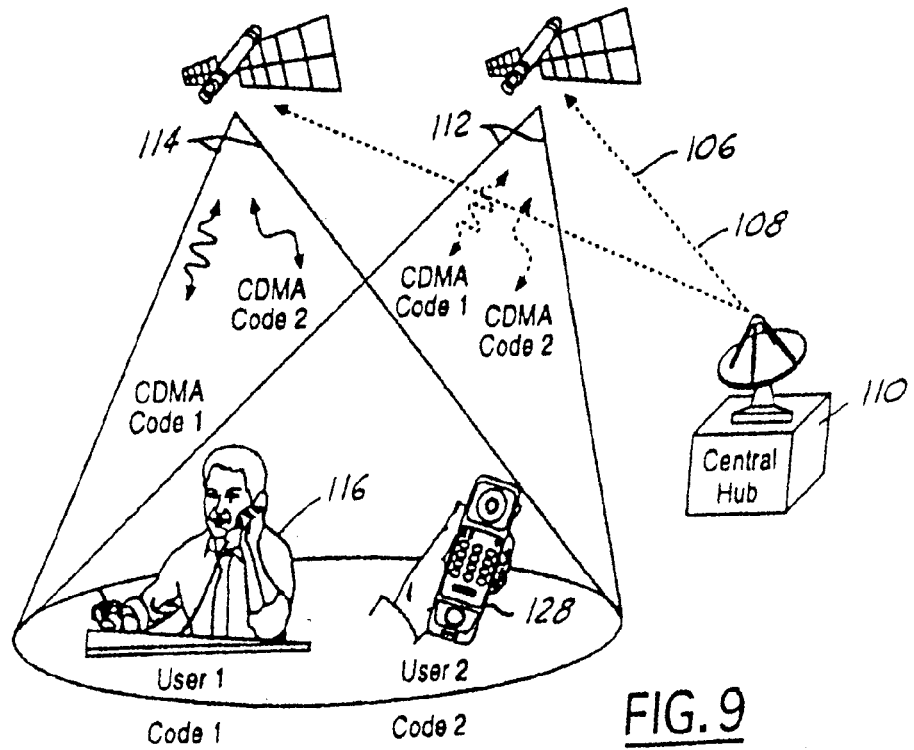
FIG. 9 illustrates a preferred embodiment of the present invention applied to the asynchronous CDMA system of FIG. 8.

In the preferred embodiment, the system 100 is an asynchronous CDMA system that utilizes imbedded time delays as described in co-pending patent application Ser. No. 09/550,505, filed Apr. 17, 2000 and entitled "Coherent Synchronization of Code Division Multiple Access Signals," which is hereby incorporated by reference. In accordance with the preferred system, the signals 112, 114 from each transponder 102, 104 will arrive completely in-phase because appropriate time delays are pre-determined and applied to the signals 112, 114 at the central hub 100, as is shown in FIG. 9. It should be understood that other time delay methods can also be utilized.

As shown, the first user 116 receives signals 112 from each of the transponders 102, 104 using the same code ("code 1"). Similarly, the second user 128 receives signals 114 from each of the transponders 102, 104 using the same code ("code 2"). The central hub 110 determines the time delay between the users and the hub for signals transmitted or received via each transponder and inserts appropriate delays to equalize the total delay via each transponder. Thus, the intended signals from different transponders will all arrive at the intended user in-phase, while non-intended signals will arrive out of phase.

The multi-platform system 100 synchronizes all platforms or transponder nodes 102, 104 in reference to each user 116 of the system. This synchronization process involves techniques and procedures to synchronize at least three parameters, including timing, phase, and frequency of signals in both the forward link and the return link. The bulk of the required processing to accomplish this synchronization is performed at the central hub 110.

In accordance with a preferred embodiment, the results of the synchronization process can be used to assist in a determination of user position. Through this technique, certain data that has been obtained during the normal synchronization operation can be used to provide information about user positioning that will allow the system to operate in a manner that is more profitable and generates additional revenues. This technique can be accomplished without requiring the dedication of additional resources from the space segment 54 or the user segment 56.

Three key parameters that are synchronized by the central hub 110 include timing, phase, and frequency. Further, in accordance with the preferred technique, the following parameters are utilized:

| | |
|---|---|
| $\vec{R}_{pi}$ | Relative position vector of user with respect to platform $i$. |
| $\dot{\vec{R}}_{pi}$ | Relative velocity vector of user with respect to platform $i$. |
| $r_{pi}$ | Range of user with respect to platform $i$. |
| $\dot{r}_{pi}$ | Range rate of user with respect to platform $i$. |

-continued $\begin{pmatrix} x \\ y \\ z \end{pmatrix}$  Unknown position vector of user.

$\begin{pmatrix} x_{pi} \\ y_{pi} \\ z_{pi} \end{pmatrix}$  Known position vector of platform $i$.

$n_p$  Number of platforms in the system.

In order to describe the operation of the preferred user positioning method, the user position vector to be determined is assumed to be:

$\begin{pmatrix} x \\ y \\ z \end{pmatrix}$

It is assumed that the positions of the platforms 102, 104 are known. Therefore, unknown ranges of the user are determined as follows:

$$r_i^2 = (x-x_{pi})^2 + (y-y_{pi})^2 + (z-z_{pi})^2$$

As discussed above, the synchronization process requires the use of a timing delay of the signal along both the forward and return links. The timing delay parameter is proportional to range, thus, the above set of equations results in $n_p$ equations with three unknowns: x, y and z. When $n_p$ is greater than three (3), then there is a larger number of measurements than are needed to determine the unknown user position. If $n_p$ is less than three, this information is still useful for determining user positions when combined with beam direction information in the case of single platform system.

The frequency parameter information from synchronization can also be used to establish more user positioning information. The frequency measurement is proportional to range rate and is thus related to the unknown user position in accordance with the following equation:

$$r_i \dot{r}_i = (x-x_{pi})(\dot{x}-\dot{x}_{pi}) + (y-y_{pi})(\dot{y}-\dot{y}_{pi}) + (z-z_{pi})(\dot{z}-\dot{z}_{pi})$$

This provides an additional set of equations when it is assumed that the position rate can be determined from a position change with respect to time.

The final synchronization parameter is phase, which also contributes information to user positioning, but in a highly non-linear, modular way. The determined phase is related to range as follows:

$$\text{phase} \approx r_i \bmod \lambda$$

The parameters derived in the synchronization process of the operation of the multi-platform system 100, are thus used to determine the user position without the need to collect additional data. The preferred method thus tracks the user's position on the system 100 and monitors the time delays for signals transmitted to and received from any user. The system 100 can thus adjust the time delays depending upon the coherency of the signals. For any given user there may be any number of different time delays. Thus, based on the user positioning information, the time delay estimates can be modified. This thus allows for the additional utilization of the information that are already available to increase the profitability of the system.

Having now fully described the invention, it will be apparent to one of ordinary skill in the art that many changes and modifications can be made thereto without departing from the spirit or scope of the invention as set forth herein.

What is claimed is:

1. A method for determining user position, comprising:
   providing a plurality of individual transponding nodes;
   establishing a plurality of links from a central processing hub with at least one remote user through said plurality of individual transponding nodes;
   processing, at said hub, a plurality of signals transmitted from said at least one remote user through said plurality of links, including assigning a same code to each of said plurality of links, such that the timing, phase, and frequency of signals in both the forward and return links with respect to said at least one remote user are synchronized for said plurality of individual transponding nodes; and
   determining the range of said at least one remote user utilizing the timing.

2. The method of claim 1, further comprising:
   providing additional information about the position of said at least one remote user based on the frequency.

3. The method of claim 2, further comprising:
   assisting in determining the position of said at least one remote user based on the phase.

4. The method of claim 1, wherein the range is related to the user position by the following equation:

$$r_i^2 = (x-x_{pi})^2 + (y-y_{pi})^2 + (z-z_{pi})^2.$$

5. The method of claim 2, wherein the user position is further conditioned by the following equation:

$$r_i \dot{r}_i = (x-x_{pi})(\dot{x}-\dot{x}_{pi}) + (y-y_{pi})(\dot{y}-\dot{y}_{pi}) + (z-z_{pi})(\dot{z}-\dot{z}_{pi}).$$

6. The method of claim 3, wherein further user positioning information is provided based on the following equation:

$$\text{phase} \approx r_i \bmod \tau.$$

7. A mobile wireless communication system, comprising:
   a plurality of individual transponding nodes;
   a plurality of mobile terminals each associated with a respective remote user;
   a central hub for establishing forward and return links with one or more of said plurality of mobile terminals, each through at least two of said plurality of individual transponding nodes and wherein each of said at least two of said plurality of individual transponding nodes can communicate with a respective one of said plurality of mobile terminals at the same frequency;
   said central hub processing one or more signals received from said one or more of said plurality of mobile terminals and synchronizing one or more signals transmitted to said one or more of said plurality of mobile terminals such that an intended one of said one or more of said plurality of mobile terminals receives signals synchronously and in-phase;
   whereby said central hub can determine the position of each one of said one or more of said plurality of mobile terminals based on information stored on said central hub regarding the timing, phase and/or frequency of signals in both the forward and return links.

8. The system of claim 7, wherein said central hub uses information about the timing of signals received from said one or more of said plurality of mobile terminals to assist in determining the position of said one or more of said plurality of mobile terminals.

9. The system of claim 8, wherein said user position information is determined according to the following equation:

$$r_i^2 = (x-x_{pi})^2 + (y-y_{pi})^2 + (z-z_{pi})^2.$$

10. The system of claim 7, wherein said central hub uses information about the frequency of signals received from said one or more of said plurality of mobile terminals to assist in determining the position of said one or more of said plurality of mobile terminals.

11. The system of claim 10, wherein said user position information is determined according to the following equation:

$$r_i \dot{r}_i = (x-x_{pi})(\dot{x}-\dot{x}_{pi}) + (y-y_{pi})(\dot{y}-\dot{y}_{pi}) + (z-z_{pi})(\dot{z}-\dot{z}_{pi}).$$

12. The system of claim 7, wherein said central hub uses information about the phase of signals received from said one or more of said plurality of mobile terminals to assist in determining the position of said one or more of said plurality of mobile terminals.

13. The system of claim 12, wherein said user position information is determined according to the following equation:

$$\text{phase} \approx r_i \bmod \tau.$$

14. The system of claim 7, wherein said central hub uses information about the timing, phase and frequency of signals received from said one or more of said plurality of mobile terminals to assist in determining the position of said one or more of said plurality of mobile terminals.

15. A method for determining the position of a mobile user terminal in a wireless communication system, comprising:
providing a plurality of mobile user terminals;
establishing links between each of said plurality of mobile user terminals and a hub through a plurality of transponding nodes;
processing a plurality of signals from said plurality of mobile user terminals at said hub such that signals are delivered to at least one intended. mobile user terminal of said plurality of mobile terminals coherently and in-phase, and wherein said hub can transmit a plurality of signals at the same frequency to said at least one intended mobile user terminal through said plurality of transponding nodes; and
determining the position of said at least one intended mobile user terminal based on signals received from said at least one intended mobile user terminal and stored on said hub as timing, phase, and/or frequency information.

16. The method of claim 15, wherein said determining includes gathering information about the position of said at least one intended mobile user terminal based on frequency information.

17. The method of claim 15, wherein said determining includes gathering information about the position of said at least one intended mobile user terminal based on timing information.

18. The method of claim 15, wherein said determining includes gathering information about the position of said at least one intended mobile user terminal based on phase information.

19. The method of claim 15, wherein said determining includes gathering information about the position of said at least one intended mobile user terminal based on any combination of information from each of said timing, phase, and frequency.

20. The method of claim 15, wherein each of said plurality of transponding nodes is independently selected from one of the following system types: a space-based system, a high altitude platform system, or a tower based cellular network.

21. A multi-platform communication system, comprising:
a hub for transmitting synchronized signals; and
a plurality of transponding nodes capable of receiving the synchronized signals from said hub and transmitting the synchronized signals to at least one intended user terminal such that the synchronized signals are received by said at least one intended user terminal synchronously and in-phase,
wherein said hub uses one or more of timing, phase and frequency information collected from one or more signals from said at least one intended user terminal to determine the position of said at least one intended user terminal and synchronize signals.

22. The system of claim 21, further comprising a plurality of user terminals, and
wherein said hub is capable of establishing links with said at least one intended user terminal and at least one of said plurality of user terminals, each through at least two of said plurality of transponding nodes, and
wherein each of said at least two of said plurality of transponding nodes can communicate with a respective one of said at least one intended user terminal and said at least one of said plurality of user terminals at the same frequency.

23. The system of claim 22, wherein said hub is capable of collecting information from one or more signals from said at least one intended user terminal and said at least one of said plurality of user terminals, for synchronizing signals such that said at least one intended user terminal receives the signals synchronously and in-phase.

24. The system of claim 23, wherein said hub synchronizes one or more of timing, phase and frequency of the synchronized signals.

25. The system of claim 21, wherein each one of said plurality of transponding nodes is selected from a group consisting of a space-based system, a high-altitude platform system and a tower-based cellular system.

26. A method of transmitting communication signals to multiple user terminals, comprising:
processing signals from multiple user terminals at a hub to obtain information for synchronization and determination of the positions of said multiple user terminals; and
using the information to transmit synchronized signals from said hub through a plurality of transponding nodes to at least one intended user terminal of said multiple user terminals such that the synchronized signals are received by said at least one intended user terminal synchronously and in-phase, and further comprising:
establishing forward and return links between said hub and said at least one intended user terminal and at least one other terminal of said multiple user terminals, each through at least two of said plurality of transponding nodes, and
transmitting from each of said at least two of said plurality of transponding nodes to a respective one of said at least one intended user terminal and said at least one other terminal at the same frequency.

27. A method of transmitting communication signals to multiple user terminals, comprising:

processing signals from multiple user terminals at a hub to obtain information for synchronization and determination of the positions of said multiple user terminals; and using the information to transmit synchronized signals from said hub through a plurality of transponding nodes to at least one intended user terminal of said multiple user terminals such that the synchronized signals are received by said at least one intended user terminal synchronously and in-phase, wherein the information obtained at said hub comprises timing, phase and frequency information, and wherein said hub synchronizes one or more of the timing, phase and frequency of signals transmitted to said at least one intended user terminal and said at least one other terminal in both a forward: link and a return link.

28. The method of claim 27, wherein the synchronized signals have incorporated therein a timing delay in both the forward and return links.

29. The system of claim 27, wherein each one of said plurality of transponding nodes is selected from a group consisting of a space-based system, a high-altitude platform system and a tower-based cellular system.

30. A method for determining user position in a multi-transponder communication system, comprising:

collecting data from signals received from user terminals at a hub through a plurality of transponding nodes, and determining at said hub, the positions of said user terminals using the collected data, wherein the data includes frequency, timing and/or phase data, and further comprising:

after determining the positions of said user terminals, synchronizing signals at said hub such that the synchronized signals when transmitted from said hub through at least two of said plurality of transponding nodes arrive at an intended one of said user terminals coherently and in-phase and arrive at a non-intended one of said user terminals out-of-phase.

31. The method of claim 30, wherein the step of synchronizing comprises use of a timing delay in the synchronized signals in both forward and return links between said hub and said intended one of said user terminals.

32. The method of claim 31, further comprising modifying the timing delay based on position of said intended one of said user terminals.

33. The method of claim 32, further comprising tracking the position of said intended one of said user terminals and suitably modifying the time delay of signals transmitted to and received from said intended one of said user terminals.

34. A method for communicating signals to multiple user terminals in a multi-transponder communication system, comprising:

collecting user position information, including timing, phase and frequency information, from signals received from said multiple user terminals at a hub;

determining, at said hub, the positions of said multiple user terminals using the collected user position information;

synchronizing signals for transmission through at least two transponding nodes to an intended one of said multiple user terminals using the collected user position information; and transmitting synchronized signals to said at least two transponding nodes such that said at least two transponding nodes transmit the synchronized signals for arrival at said intended one of said multiple user terminals synchronously and in-phase.

35. The method of claim 34, wherein the step of synchronizing comprises use of a timing delay in the synchronized signals in both forward and return links.

36. The method of claim 35, further comprising tracking the position of said intended one of said multiple user terminals and suitably modifying the time delay of the synchronized signals transmitted to said intended one of said multiple user terminals.

* * * * *